United States Patent
Pezeshki et al.

(10) Patent No.: US 11,570,711 B2
(45) Date of Patent: Jan. 31, 2023

(54) USER EQUIPMENT INDICATION OF WAKE UP SIGNAL RECEPTION AT MILLIMETER WAVE FREQUENCIES USING DIGITAL BEAMFORMING

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 17/149,962

(22) Filed: Jan. 15, 2021

(65) Prior Publication Data
US 2022/0086754 A1   Mar. 17, 2022

Related U.S. Application Data

(60) Provisional application No. 63/078,882, filed on Sep. 15, 2020.

(51) Int. Cl.
*H04W 4/00* (2018.01)
*H04W 52/02* (2009.01)
(Continued)

(52) U.S. Cl.
CPC ...... *H04W 52/0229* (2013.01); *H04B 7/0617* (2013.01); *H04W 8/24* (2013.01); *H04W 72/042* (2013.01); *H04W 72/046* (2013.01); *H04W 72/0493* (2013.01); *H04W 76/27* (2018.02); *H04W 76/28* (2018.02); *H04W 80/02* (2013.01)

(58) Field of Classification Search
None
See application file for complete search history.

(56) References Cited

U.S. PATENT DOCUMENTS

2017/0019157 A1   1/2017   Mo et al.
2019/0254110 A1*  8/2019   He .................... H04W 76/28
(Continued)

FOREIGN PATENT DOCUMENTS

WO    2019095182 A1    5/2019

OTHER PUBLICATIONS

International Search Report and Written Opinion—PCT/US2021/049219—ISA/EPO—dated Dec. 14, 2021; 14 pages.

*Primary Examiner* — Clemence S Han
(74) *Attorney, Agent, or Firm* — Arun Swain; The Marbury Law Group, PLLC

(57) ABSTRACT

Embodiments include systems and methods for managing millimeter wave (mmWave) communications with wireless devices capable of mmWave digital beamforming. Various embodiments may enable a wireless device to indicate to a base station that the wireless device is capable of wake-up signal (WUS) reception at mmWave frequencies using digital beamforming. Various aspects may include sending an indication to a base station that the wireless device is capable of using digital beamforming for WUS reception. Various aspects may include scheduling one or more WUS monitoring occasions for a single discontinuous reception (DRX) cycle and a single beam configuration for each of the one or more WUS monitoring occasions.

30 Claims, 10 Drawing Sheets

(51) Int. Cl.
*H04W 76/28* (2018.01)
*H04B 7/06* (2006.01)
*H04W 72/04* (2009.01)
*H04W 80/02* (2009.01)
*H04W 76/27* (2018.01)
*H04W 8/24* (2009.01)

(56) References Cited

U.S. PATENT DOCUMENTS

2019/0387572 A1 12/2019 Nam et al.
2021/0051589 A1* 2/2021 Nam ................ H04W 52/0235

* cited by examiner

USER EQUIPMENT INDICATION OF WAKE UP SIGNAL RECEPTION AT MILLIMETER WAVE FREQUENCIES USING DIGITAL BEAMFORMING

RELATED APPLICATIONS

This application claims the benefit of priority to U.S. Provisional Application No. 63/078,882 entitled "UE Indication of WUS Reception At mmWave Frequencies Using Digital Beamforming" filed Sep. 15, 2020, the entire contents of which are incorporated herein by reference for all purposes.

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago. New technologies enabling increased data rates include the use of higher frequency bands, such as millimeter wave (mmWave) frequency bands, and using beam forming antennas. Millimeter wave frequency bands are susceptible to rapid channel variations and suffer from free-space pathloss and atmospheric absorption. To address these challenges, NR base stations and wireless devices may use highly directional antennas (i.e., beam forming antennas) to achieve sufficient link budget with wireless devices in wide area networks. Such highly directional antennas require precise alignment of the transmitter and the receiver beams, for example, using beam management operations. However, beam management operations may increase the latency of establishing a communication link, and may affect control layer procedures, such as initial access, handover and beam tracking.

SUMMARY

Various aspects include systems and methods for managing millimeter wave (mmWave) communications. Various aspects may enable a wireless device to indicate to a base station that the wireless device is capable of wake-up signal (WUS) reception at mmWave frequencies using digital beamforming. Various aspects include methods that may be performed by a processor of a wireless device or a processor of a base station. Various aspects may include sending an indication to the base station that the wireless device is capable of using digital beamforming for WUS reception, receiving a WUS configuration message from the base station, the WUS configuration message indicating a WUS monitoring occasion for a single discontinuous reception (DRX) cycle and a single beam configuration for the WUS monitoring occasion, and using digital beamforming to receive a WUS message from the base station during the WUS monitoring occasion in response to receiving the WUS configuration message from the base station.

Some aspects may further include receiving a physical downlink control channel (PDCCH) message during the single DRX cycle in response to receiving the WUS message from the base station during the WUS monitoring occasion. In some aspects, receiving the PDCCH message during the single DRX cycle may include receiving the PDCCH message during the single DRX cycle on a beam having a different beam configuration than the single beam configuration for the WUS monitoring occasion in response to receiving the WUS message from the base station during the WUS monitoring occasion. In some aspects, the different beam configuration may include a different transmission configuration indicator (TCI) state. In some aspects, receiving the PDCCH message during the single DRX cycle may include receiving the PDCCH message during the single DRX cycle on a beam having a same beam configuration as the single beam configuration for the WUS monitoring occasion. In some aspects, receiving the PDCCH message during the single DRX cycle may include using digital beamforming to receive the PDCCH message during the single DRX cycle. In some aspects, the WUS message and the PDCCH message are different format downlink control information (DCI) messages.

In some aspects, sending the indication to the base station that the wireless device is capable of digital beamforming for WUS reception may include sending the indication in one of an uplink control information (UCI) message, a medium access control (MAC) control element (CE)(MAC-CE) message, or a radio resource control (RRC) message.

In some aspects, sending the indication to the base station that the wireless device is capable of digital beamforming for WUS reception may include sending an indication to the base station that the wireless device is capable of mmWave digital beamforming for WUS reception in one of Frequency Range (FR) 2 or FR4.

Various aspects may include receiving an indication from a wireless device that the wireless device is capable of using digital beamforming for WUS reception, transmitting a WUS configuration message for a single DRX cycle of the wireless device in response to receiving the indication from the wireless device that the wireless device is capable of using digital beamforming for WUS reception, the WUS configuration message indicating a WUS monitoring occasion for the single DRX cycle and a single beam configuration for the WUS monitoring occasion. Some aspects may further include transmitting a WUS message to the wireless device using a beam having the single beam configuration during the WUS monitoring occasion. Some aspects may further include transmitting a PDCCH message during the single DRX cycle in response to transmitting the WUS message. In some aspects, transmitting the PDCCH message during the single DRX cycle may include transmitting the PDCCH message during the single DRX cycle using a beam having a same beam configuration as the single beam configuration. In some aspects, transmitting the PDCCH message during the single DRX cycle may include transmitting the PDCCH message during the single DRX cycle using a beam having a different beam configuration than the single beam configuration. In some aspects, the different beam configuration may include a different TCI state. In some aspects, the WUS message and the PDCCH message are different format DCI messages.

In some aspects, the indication from the wireless device that the wireless device is capable of digital beamforming for WUS reception may be received in one of a UCI message, a MAC-CE message, or a RRC message.

In some aspects, receiving the indication from the wireless device that the wireless device is capable of digital beamforming for WUS reception may include receiving an indication from the wireless device that the wireless device is capable of mmWave digital beamforming for WUS reception in one of FR2 or FR4. In some aspects, the beam having the single beam configuration may include one of a mmWave beam in FR2 or a mmWave beam in FR4.

Further aspects may include a wireless device having a processor configured to perform one or more operations of any of the methods summarized above. Further aspects may include processing devices for use in a wireless device configured with processor-executable instructions to perform operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device and that includes a processor configured to perform one or more operations of any of the methods summarized above. Further aspects may include a base station having a processor configured to perform one or more operations of any of the methods summarized above. Further aspects may include processing devices for use in a base station configured with processor-executable instructions to perform operations of any of the methods summarized above. Further aspects may include a non-transitory processor-readable storage medium having stored thereon processor-executable instructions configured to cause a processor of a base station to perform operations of any of the methods summarized above. Further aspects include a base station having means for performing functions of any of the methods summarized above. Further aspects include a system on chip for use in a base station and that includes a processor configured to perform one or more operations of any of the methods summarized above.

DETAILED DESCRIPTION

Figure 1:
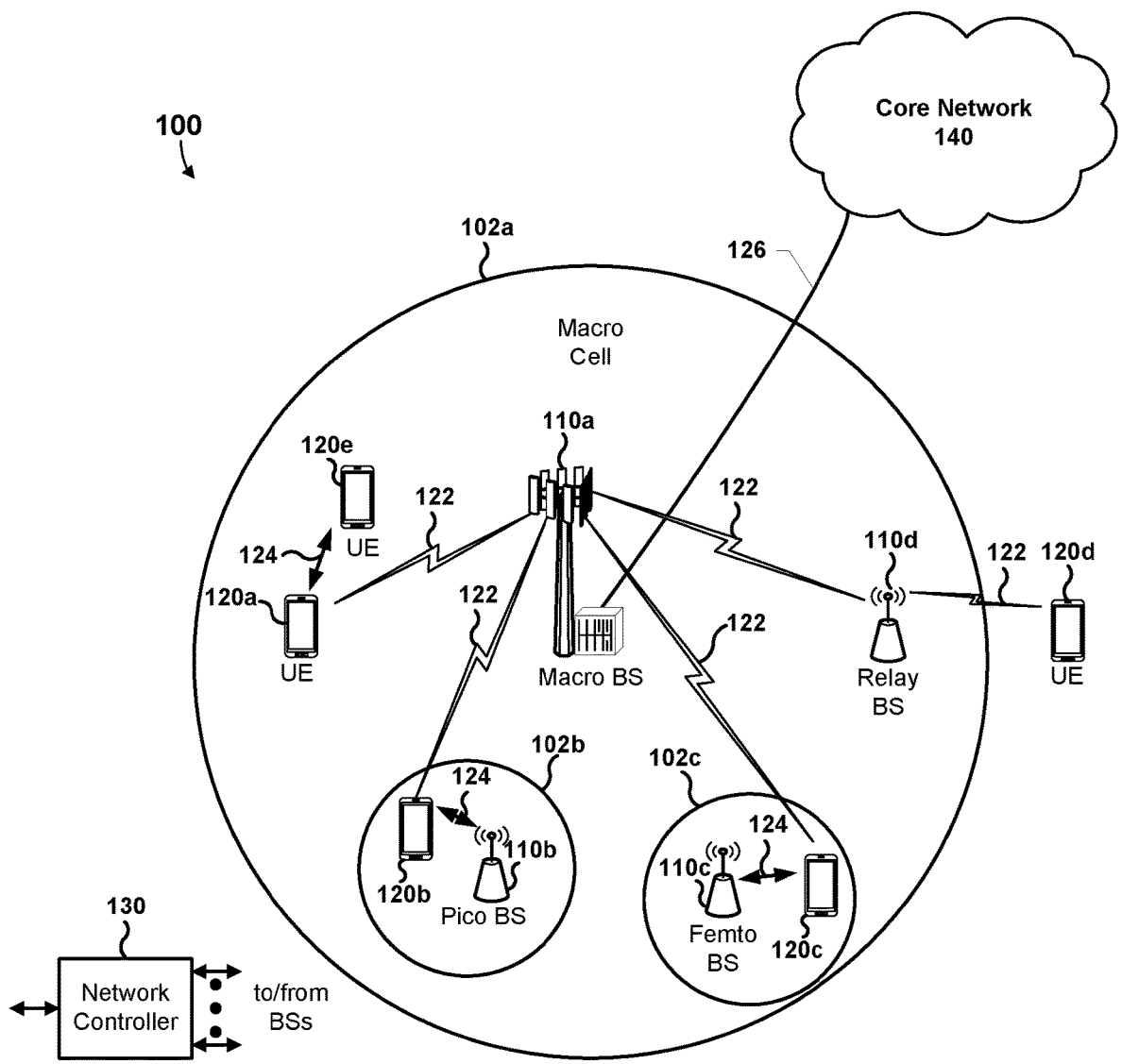
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for managing millimeter wave (mmWave) communications. Various embodiments may enable a wireless device to indicate to a base station that the wireless device is capable of wake-up signal (WUS) reception at mmWave frequencies using digital beamforming. Various embodiments may include a base station configuring one or more WUS monitoring occasions for a single discontinuous reception (DRX) cycle such that each of the one or more WUS monitoring occasions has a single beam configuration. A single beam configuration may be a beam configuration having a single transmission configuration indicator (TCI) state. A single WUS monitoring occasion with a single beam configuration may be sufficient for successful WUS reception when a wireless device is using digital beamforming making WUS reception more robust in various embodiments as a single beam may be used for a WUS in comparison to current WUS processes in which beam sweeping is required. As a single WUS monitoring occasion with a single beam configuration may be sufficient for successful WUS reception when a wireless device is using digital beamforming, in some embodiments a base station may transmit a WUS on a single beam for WUS, either once per DRX cycle or multiple times per DRX cycle without having to form different beams as is required in current networks.

The transmission of a WUS on a single beam when a wireless device is capable of WUS reception at mmWave frequencies using digital beamforming may increase the likelihood of WUS reception by the wireless device in comparison to current WUS operations because mismatching in beam sweeping operations between the wireless device and base station may not occur. Additionally, the configuration of a single WUS monitoring occasion with a single beam configuration according to various embodiments may enable a TCI state of the beam for WUS transmission to be different than the TCI state used for a beam during the on-duration or active time of a DRX cycle.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

As used herein, the term "RF chain" refers to the components in a communication device that send, receive, and decode radio frequency signals. An RF chain typically includes a number of components coupled together that transmit RF signals that are referred to as a "transmit chain," and a number of components coupled together that receive and process RF signals that are referred to as a "receive chain."

Fifth Generation (5G) New Radio (NR) systems can provide high data rate communication services to wireless devices. However, the higher frequency bands, such as millimeter wave (mmWave) frequency bands, are susceptible to rapid channel variations and suffer from free-space pathloss and atmospheric absorption. As used herein, mmWave frequency bands may include the mmWave spectrum bands assigned in 5G/NR operating frequency range (FR) 2, such as a 24.25-27.5 GHz mmWave spectrum band (e.g., band n258), a 26.5-29.5 GHz mmWave spectrum band (e.g., band n257), a 27.5-28.35 GHz mmWave spectrum band (e.g., band n261), a 37-40 GHz mmWave spectrum band (e.g., band n260), a 39.5-43.5 GHz mmWave spectrum band (e.g., band n259), etc. To address these limitations in mmWave communications, NR base stations and wireless devices may use highly directional antennas to achieve sufficient link budgets in wide area networks. Such highly directional antennas require precise alignment of the transmitter and the receiver beams, for example, using beam management operations. However, beam management operations may increase latency due to the time required to establish communication links, and may affect control layer procedures, such as initial access, handover and beam tracking.

Millimeter wave receivers employ analog or hybrid beamforming circuitry and processing techniques. Analog or hybrid beamforming is performed in radio frequency (RF) or at an intermediate frequency (IF) through a bank of phase shifters (PSs). The receiver may include one PS per antenna element. This architecture reduces the power consumption by using only one (e.g., high-resolution) analog to digital converter (ADC) per RF chain at the receiver (Rx). While analog and hybrid beamforming are power efficient, they are only capable of receiving in one or a few directions at a given time, precluding multiplexed reception multiplexing capabilities.

Millimeter wave receivers also may be configured to employ digital beamforming techniques. Digital beamforming may be performed in baseband. Each antenna element within an antenna panel may be coupled to an associated ADC in the Rx, with preferential reception processing, which enhances the reception capability in a particular direction (referred to as a reception beam), performed within a digital processor rather than analog circuitry as used in analog and hybrid beamforming techniques. This enables the Rx to simultaneously tune reception beams in any direction supported by the antenna panel, in contrast to analog and hybrid beamforming techniques that are limited to a few predefined reception beams that are a function of the analog processing of RF signals.

Digital reception beamforming has not been deployed in wireless devices to date due to the high power consumption of the ADCs that are coupled to each antenna element. Wireless devices are battery powered, and thus are power constrained to provide sufficient service on a given battery charge. Powering a conventional ADC for each antenna element would limit battery life or require the use of large batteries. However, recent research in digital beamforming technologies offers the promise that digital beamforming may be possible in 5G NR-capable wireless devices by using lower resolution ADCs that draw less power. For example, instead of using ADCs with 8-bit resolution (i.e., the ability to resolve RF received power into 256 levels), research is indicating that ADCs with 3-bit resolution (i.e., the ability to resolve RF received power into 8 levels) 4-bit resolution (i.e., the ability to resolve RF received power into 16 levels) in digital beamforming applications achieve acceptable antenna gain with acceptable power demand. Thus, there is the potential that digital beamforming capabilities may be deployed in 5G NR-capable wireless devices in the near future.

Digital beamforming techniques may not replace analog and hybrid beamforming techniques that are deployed today and work well, but instead may be implemented as an alternative antenna processing option that may be activated when analog and hybrid beamforming techniques suffer beam failure. This is because the higher gain possible through digital beamforming may be sufficient to maintain a link without performing a beam handover procedure when an analog reception beam exhibits unacceptable link quality. Digital beamforming may also provide other benefits that may be useful or preferable over analog and hybrid beamforming techniques in certain conditions, link quality demands, or applications.

To enable the use of digital beamforming techniques when deployed in wireless devices, and when activated or available, new signaling will be required between wireless devices and network nodes. Various embodiments may enable a wireless device to indicate to a base station that the wireless device is capable of WUS reception at mmWave frequencies using digital beamforming.

FIG. 1 shows a system block diagram illustrating an example communications system. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 2:
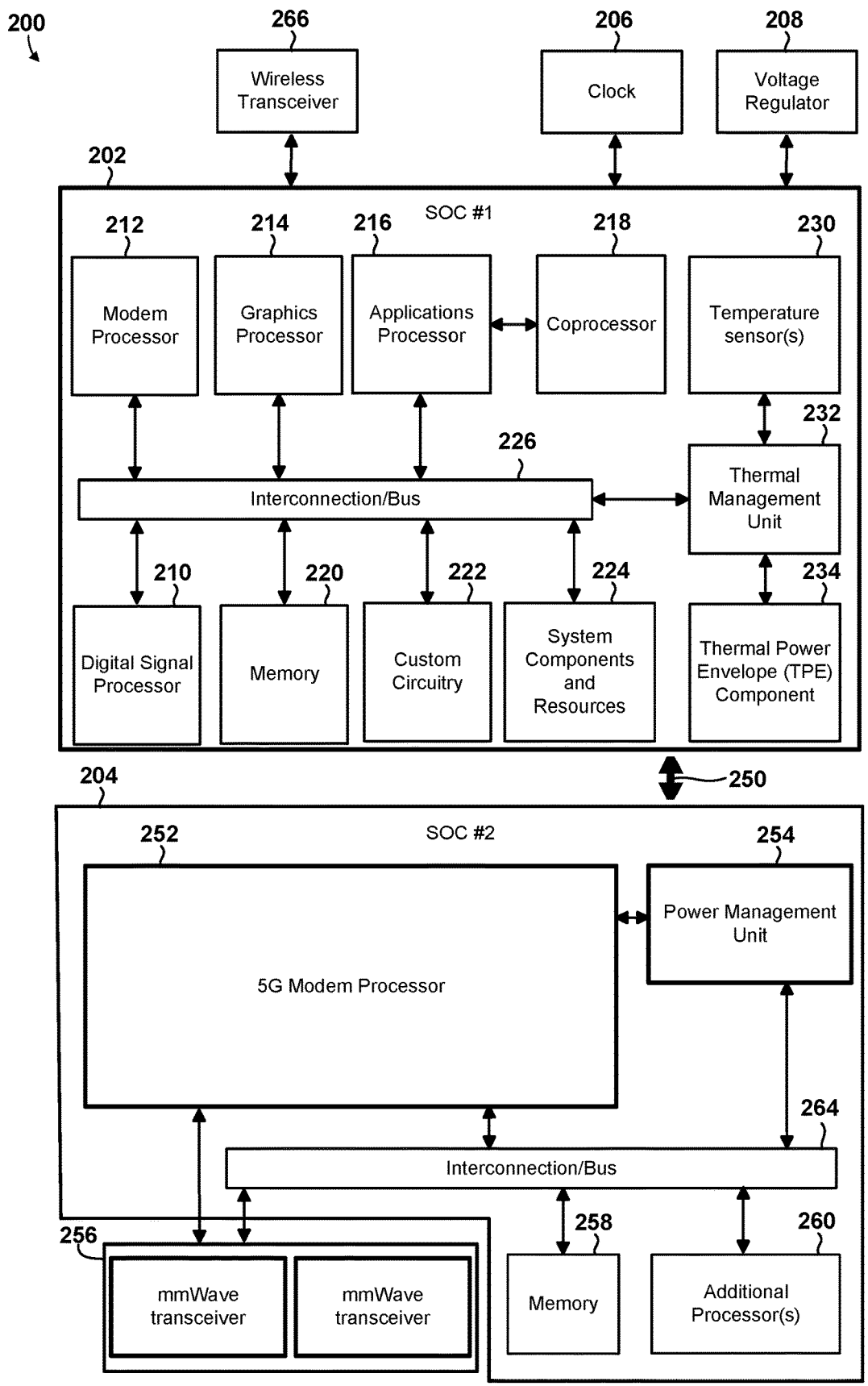
FIG. 2 is a component block diagram illustrating an example computing system and wireless modem suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, memory 258, and various additional processors 260, such as an applications processor, packet processor, etc. The second SOC 204 may be coupled to a plurality of mmWave transceivers 256, such as via the interconnection/bus 264 and/or directly to the 5G modem processor 252.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
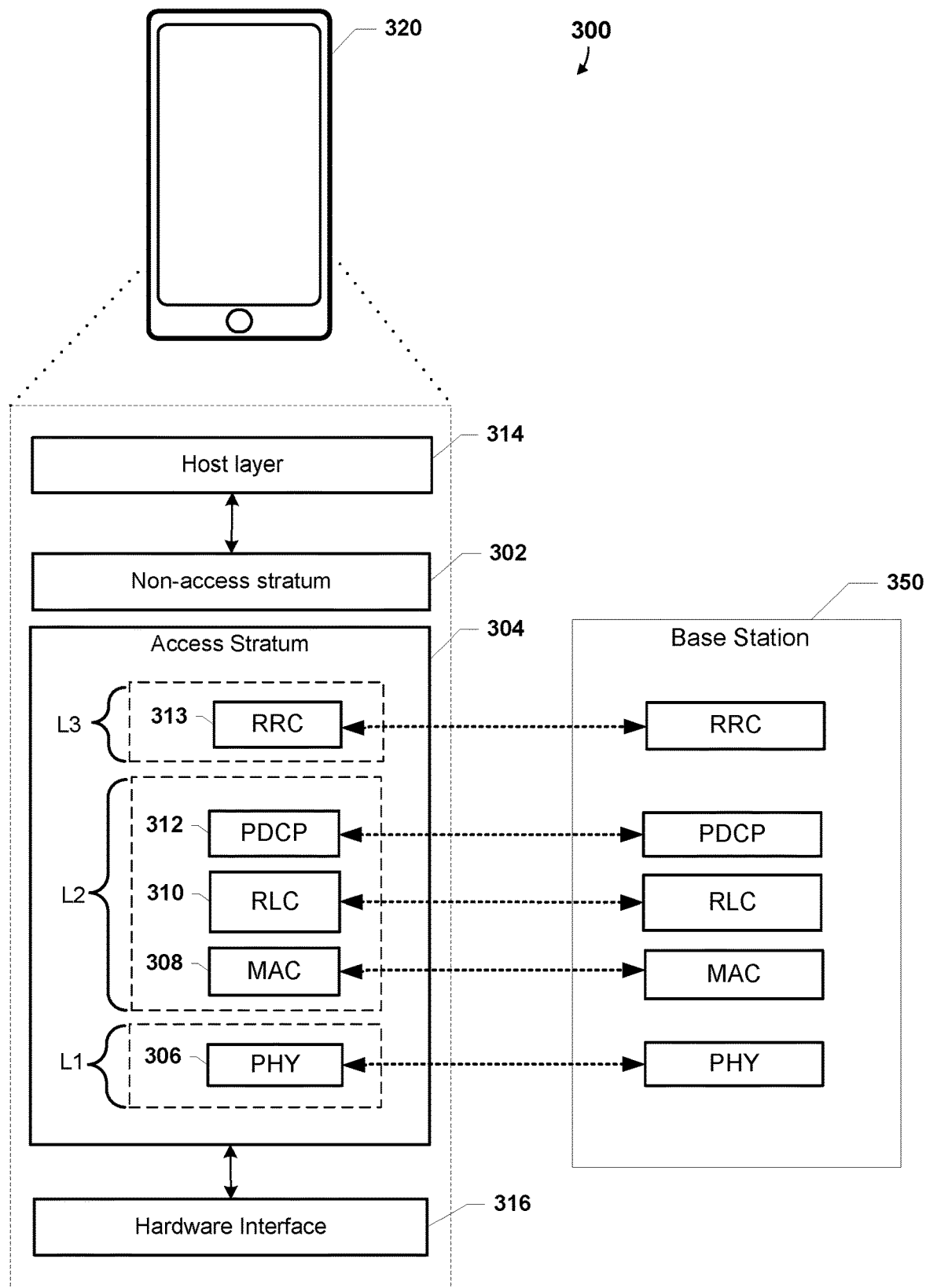
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
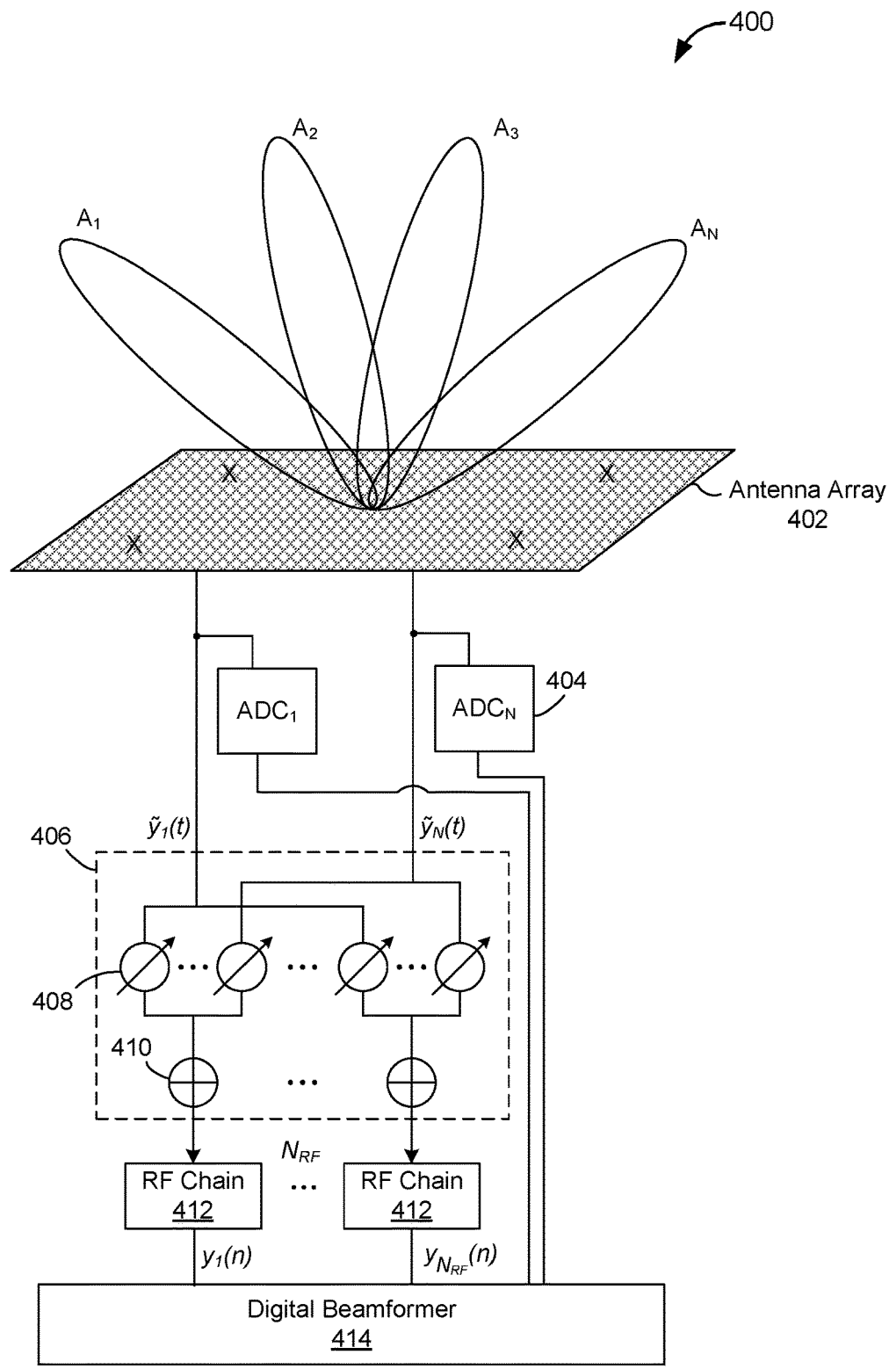
FIG. 4A is a component block diagram illustrating a mmWave receiver suitable for use with various embodiments.
Figure 4B:
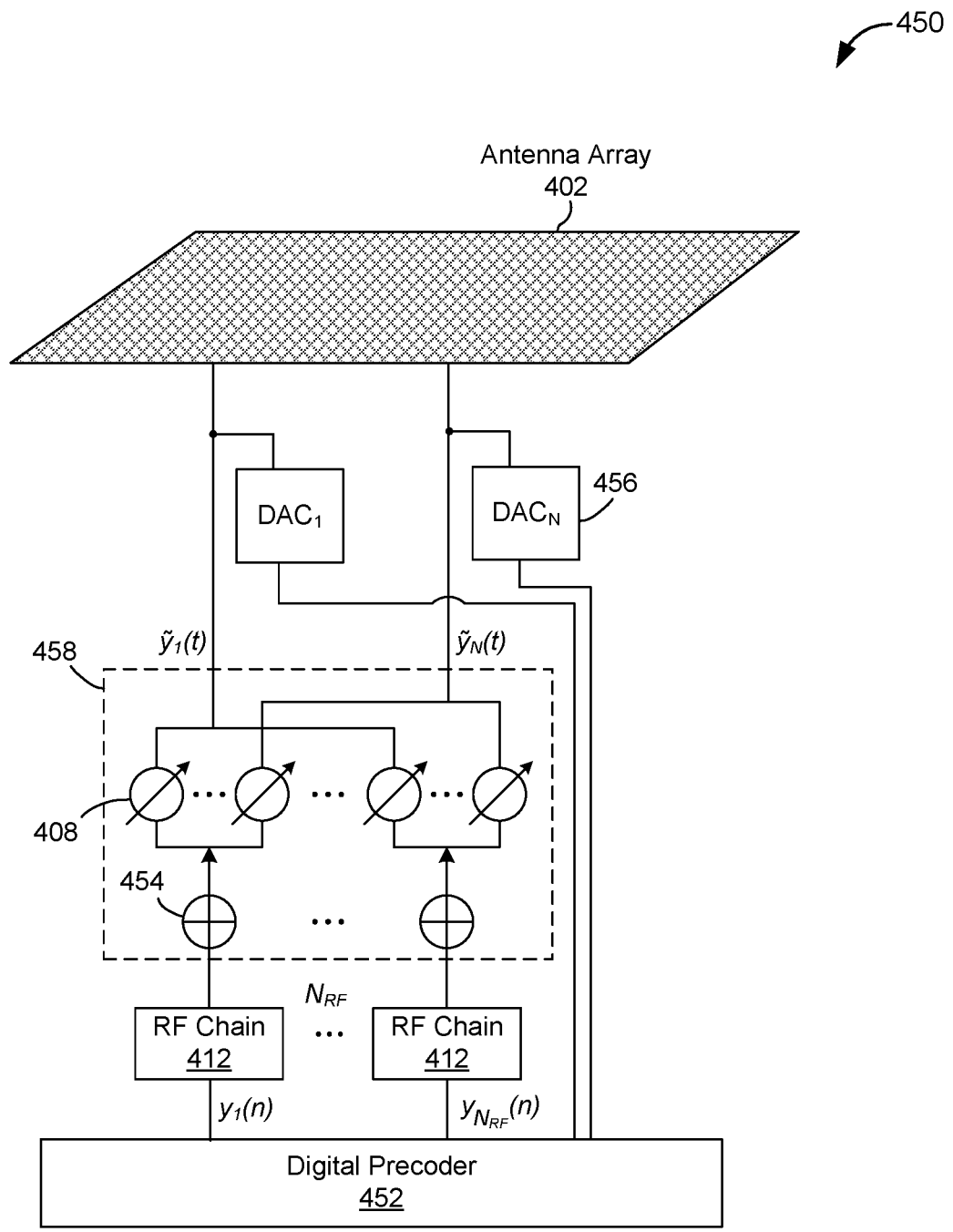
FIG. 4B is a component block diagram illustrating a mmWave transmitter suitable for use with various embodiments.

FIG. 4A is a component block diagram illustrating a mmWave receiver 400, and FIG. 4B is a component block diagram illustrating a mmWave transmitter 450, suitable for use with various embodiments. The mmWave receiver 400 and the mmWave transmitter 450 may also be referred to as beamforming architectures. With reference to FIGS. 1-4B, the mmWave receiver 400 and the mmWave transmitter 450 may be used in a wireless device (e.g., 120a-120e, 200, 320) or a base station (e.g., 110a-110d, 200, 350).

In various embodiments, a wireless device may be configured with both the mmWave receiver 400 and the mmWave transmitter 450 (i.e., with both architectures), and may use either or both. Implementing a wireless device with multiple architectures addresses limitations of a single static architecture. One architecture may be efficient (e.g., use an appropriate spectral efficiency, resolution, and/or power consumption and/or the like) for a first set of communications and another architecture may be efficient for a second set of communications. In contrast, static selection of a single architecture may cause inefficient utilization of computing, communication, network, and/or power resources by using the single architecture to transmit and/or receive communications.

Referring to FIG. 4A, the mmWave receiver 400 includes an antenna array 402 of a plurality of antenna elements included within one or more antenna panels. In FIG. 4A, the value "N" represents the number of antenna elements in the antenna array 402. The antenna array 402 may include a plurality of cross-polarized antennas (each symbolized by an "X"). In some embodiments, the wireless device may be configured with four dual-pole antennas (i.e., eight in total). Based on a selected beamforming codebook, which may be translated into a set of phase shifts in an analog beamforming block, the wireless device may form beams $A_1$ up to $A_N$.

A conventional mmWave receiver 400 may be configured to perform analog or hybrid beamforming. A signal $\tilde{y}_N(t)$ received at an antenna N of the antenna array 402 at a time t may propagate to a hybrid beamforming circuit 406. Hybrid beamforming may be performed in RF or at an intermediate frequency (IF) through the hybrid beamforming circuit 406. The hybrid beamforming circuit 406 may include a bank of phase shifters 408 and a summer 410 connected to some of the antenna elements. While analog and hybrid beamforming techniques are generally power efficient, they are only capable of receiving in a few directions. If a mmWave signal is received outside of an analog beam supported by the mmWave receiver 400, degradation in signal quality or even beam failure may be experienced.

A mmWave receiver 400 suitable for use with various embodiments may be configured to perform digital beamforming in addition to analog or hybrid beamforming. The mmWave receiver 400 may perform beamforming in baseband frequencies. Each antenna element (e.g., 1-N) of the antenna array 402 may be associated with an analog-to-digital converter (ADC) 404 (e.g., $ADC_1$-$ADC_N$), enabling the mmWave receiver 400 to simultaneously direct virtual receive beams (i.e., enhanced reception directions) in any direction within the angular range of the antenna. To enable power-efficient fully digital receive beamforming in mmWave frequencies, ADCs 404 with limited- or few-bit resolution (e.g., less than 5 bits) may be employed to reduce the power consumption of the ADCs 404. Such ADCs 404 may also be relatively cost-efficient. In the mmWave receiver 400, the number of antenna elements (e.g., 1-N) of the antenna array 402 may correspond to the number of RF chains 412 (e.g., 1-$N_{RF}$). In some embodiments, the wireless device may be configured with high-resolution ADCs (one per RF chain). In some embodiments, the wireless device may be configured with low-resolution ADCs (one per antenna element, up to eight low-resolution ADCs).

Referring to FIG. 4B, the mmWave transmitter 450 may include the antenna array 402 of a plurality of antenna elements included within one or more antenna panels. The wireless device may transmit $\tilde{y}_N$ (t) signals via antenna elements of the antenna array 402, as received via digital-to-analog converters DACs 456 (e.g., $DAC_1$ to $DAC_N$). The DACs 456 may receive signals from a digital precoder 452 and convert the signals to the analog domain. The digital precoder 452 may perform phase shifting, mixing, and/or other operations on the received signals.

The mmWave transmitter 450 may include a hybrid beamforming circuit 458 that may receive n signals from N RF chains 412. The hybrid beamforming circuit 458 may include a band of summers 454 and a bank of phase shifters 408. A hybrid beamforming circuit 458 may propagate a signal $\tilde{y}_N$ (t) to an antenna N of the antenna array 402.

A wireless device (e.g., a UE) may be configured to operate in a discontinuous reception (DRX) mode in which the wireless device may power down its receiver chains for periods of time, for example to conserve power. In a DRX mode the wireless device may periodically power on, or otherwise activate, its receiver chains at scheduled times to monitor for transmissions from a base station (e.g., a gNB, etc.). A "DRX cycle" encompasses an on-duration period, during which the wireless device has powered on its receiver chains and is monitoring for transmissions from the base station, and an off-duration period, during which the wireless device has powered off its receiver chains and cannot receive transmissions from the base station.

In some DRX mode implementations, a wireless device may receive a wake-up signal (WUS) from a base station (e.g., a gNB) outside of the DRX cycle. The WUS may be a downlink control information (DCI) message, such as WUS message having a DCI format 2_6, indicating whether or not there is a physical downlink control channel (PDCCH) message to be transmitted from the base station to the wireless device in the next on-duration period of the next DRX cycle. A WUS message may be less complex than other forms of DCI message by including one bit of information the state of which indicates whether or not there is a PDCCH message to be transmitted from the base station to the wireless device in the next on-duration period of the next DRX cycle. The WUS message may require less resources to receive and decode than a PDCCH message to be transmitted from the base station to the wireless device in an on-duration period of a DRX cycle. The base station may schedule WUS monitoring occasions for a DRX cycle during which the wireless device is to receive a WUS message prior to the start of the DRX cycle. In response to the WUS message received in a WUS monitoring occasion indicating there is not a PDCCH message to be transmitted from the base station to the wireless device in the next on-duration period of the next DRX cycle, the wireless device may not power on, or otherwise activate, its receiver chains in the next on-duration period of the next DRX cycle. In response to the WUS message indicating there is a PDCCH message to be transmitted from the base station to the wireless device in the next on-duration period of the next DRX cycle, the wireless device may power on, or otherwise activate, its receiver chains in the next on-duration period of the next DRX cycle to receive the PDCCH message.

In current networks, DRX modes of operation use analog beamforming operations in mmWave frequencies. Specifically, for frequency range (FR) 2 WUS reception, in current networks, multiple monitoring occasions for WUS reception are scheduled with up to three control resource set (CORESETs) for WUS reception with different quasi-colocated (QCL) beams in each CORSET, and there is at least one WUS monitoring occasion scheduled for each QCL beam. In current networks for FR2 WUS reception, multiple PDCCH search space sets can be configured for WUS message reception, and the associated CORESETs can have different transmission configuration indicator (TCI) states thereby delivering WUS messages via beam sweeping in FR2. To account for the WUS beam sweeping in FR2 by current networks, a wireless device using analog beamforming operations in mmWave frequencies must power on, or otherwise activate, its receiver chains to check multiple occasions for WUS messages with each occasion associated with different TCI states and requiring different configurations of the receiver chains. As a result, in current DRX implementations in which wireless device using analog beamforming operations in mmWave frequencies, the requirement to reconfigure and monitor for multiple different WUS instances can be a power and processing resource intensive requirement.

Various embodiments may enable a wireless device to indicate to a base station that the wireless device is capable of WUS reception at mmWave frequencies using digital beamforming. Various embodiments may include a base station (e.g., a gNB) configuring one or more WUS monitoring occasions for a single discontinuous reception (DRX) cycle such that each of the one or more WUS monitoring occasions has a single beam configuration for a wireless device that is capable of WUS reception at mmWave frequencies using digital beamforming. A single beam configuration may be a beam configuration having a single TCI state. A single beam configuration having a single TCI state may differ from other types beam configurations in which the beam configuration may have multiple TCI states. The wireless device indicating that the wireless device is capable of WUS reception at mmWave frequencies using digital beamforming may increase the robustness of WUS reception in comparison to that of current networks relying on analog beamforming. The wireless device indicating that the wireless device is capable of WUS reception at mmWave frequencies using digital beamforming may enable a base station (e.g., a gNB) to use a single beam or perform repetition of that same beam without beam sweeping for WUS transmission in mmWave frequencies. Thus, various embodiments may enable a single WUS monitoring occasion for WUS reception in mmWave frequencies to be sufficient. This may conserve power in the wireless device as there may be no WUS beam sweeping by the base station, eliminating the need for the wireless device to check multiple monitoring occasions associated with different beams as is required in current networks. Additionally, the TCI state for WUS may be decoupled from the TCI state in the on-duration/active time of the DRX cycle because a wireless device that is capable of WUS reception at mmWave frequencies using digital beamforming may receive different beams with different TCI states.

In various embodiments, the wireless device may send an indication to the base station that the wireless device is capable of using digital beamforming for WUS reception. For example, the indication may be an indication that the wireless device is capable of using digital beamforming for WUS reception in mmWave frequencies, such as FR2 frequencies, FR4 frequencies, etc. In various embodiments, the indication that the wireless device is capable of using digital beamforming for WUS reception may be sent to the base station as part of operations of a wireless device to enter a DRX mode of operation. In various embodiments, the indication that the wireless device is capable of using digital beamforming for WUS reception may be sent in a message from the wireless device to the base station, such as an uplink control information (UCI) message, a medium access control (MAC) control element (CE)(MAC-CE) message, a radio resource control (RRC) message, etc.

In various embodiments, a base station (e.g., a gNB) may receive an indication from a wireless device that the wireless device is capable of using digital beamforming for WUS reception. For example, the indication may be an indication that the wireless device is capable of using digital beamforming for WUS reception in mmWave frequencies, such as FR2 frequencies, FR4 frequencies, etc. In some embodiments, the indication that the wireless device is capable of using digital beamforming for WUS reception may be received in a message from the wireless device, such as a UCI message, a MAC-CE message, a RRC message, etc. In some embodiments, in response to receiving the indication from the wireless device that the wireless device is capable of using digital beamforming for WUS reception, the base station may transmit a WUS configuration message for a single DRX cycle of the wireless device. The WUS configuration message may indicate one or more WUS monitoring occasions for the single DRX cycle and a single beam configuration for each of the one or more WUS monitoring occasions. A single beam configuration may be a beam configuration having a single TCI state. A single beam configuration having a single TCI state may differ from other types of beam configurations in which the beam configuration may have multiple TCI states. In some embodiments, the one or more WUS monitoring occasions may be a single WUS monitoring occasion. In embodiments in which the one or more WUS monitoring occasions may be a single WUS monitoring occasion, a WUS message may be transmitted by the base station only once per DRX cycle. In some embodiments, the one or more WUS monitoring occasions may be multiple WUS monitoring occasions in each of which a WUS message is transmitted by the base station with the same beam configuration during each DRX cycle. In some embodiments, the one or more WUS monitoring occasions may be multiple WUS monitoring occasions each associated with the same CORESET. In some embodiments, the base station may transmit a PDCCH message during the DRX cycle on a beam having a different beam configuration, such as a different TCI, different CORESET, etc., than the beam used for transmitting the WUS message. In some embodiments, the base station may transmit a PDCCH message during the DRX cycle on a beam having a same beam configuration, such as a same TCI, same CORESET, etc., as the beam used for transmitting the WUS message.

In various embodiments, in response to receiving the WUS configuration message from the base station, the wireless device may use digital beamforming to receive a WUS message from the base station during one of the one or more WUS monitoring occasions. In some embodiments, the wireless device may use digital beamforming to receive a PDCCH message during the single DRX cycle on a beam having a different beam configuration than the single beam configuration for each of the one or more WUS monitoring occasions. In some embodiments, the different beam configuration may include at least a first TCI state for the beam used for WUS message transmission and a second different TCI state for the beam used for receiving the PDCCH message. In some embodiments, the WUS message and the PDCCH message may be different format DCI messages. In some embodiments, the wireless device may use digital beamforming to receive a PDCCH message during the single DRX cycle on a beam having a same beam configuration as the single beam configuration for each of the one or more WUS monitoring occasions.

Figure 5A:
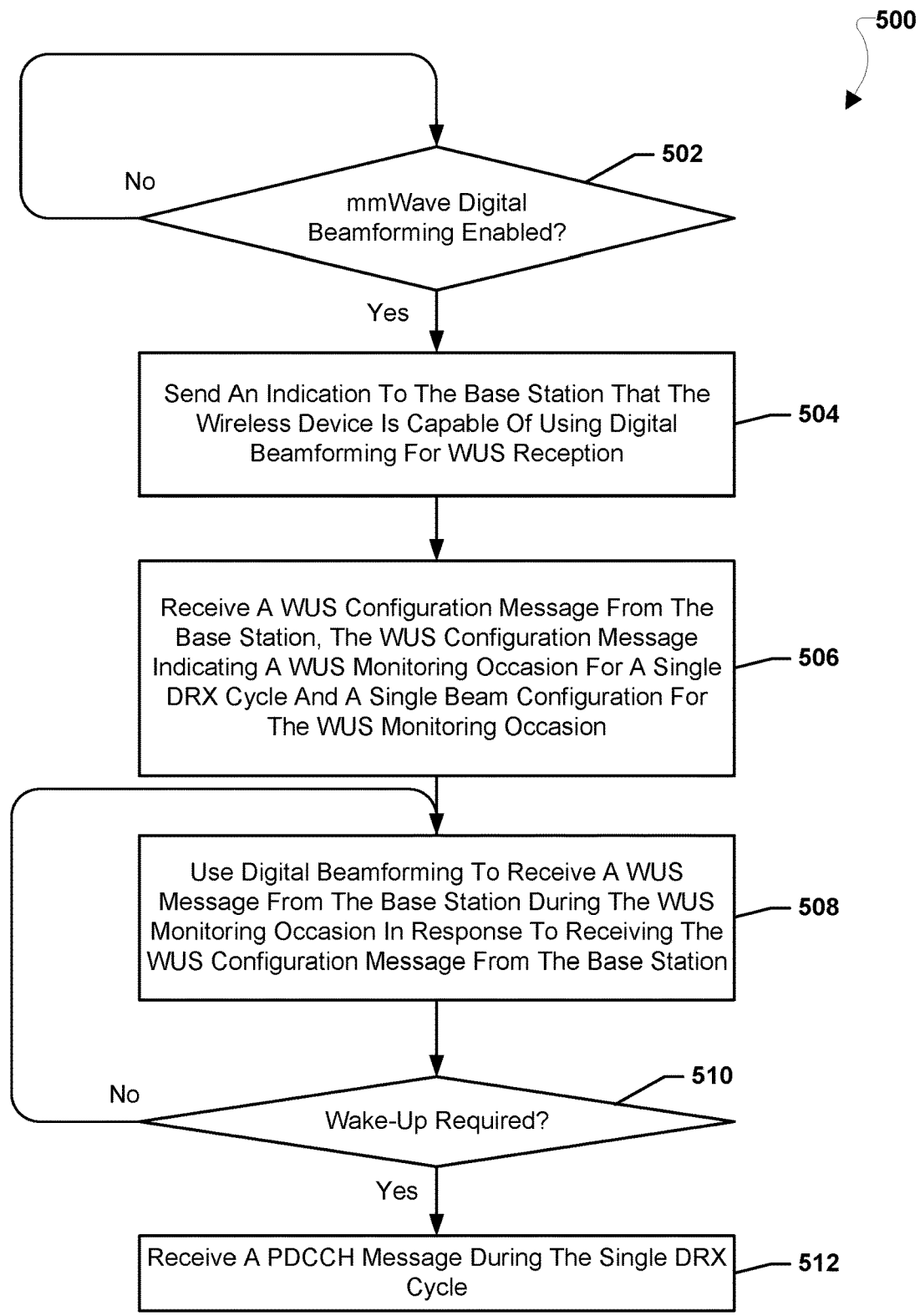
FIG. 5A is a process flow diagram illustrating a method for managing communications with a base station in accordance with various embodiments.

FIG. 5A is a process flow diagram illustrating a method 500 that may be performed by a processor of a wireless device for managing communications with a base station in accordance with various embodiments. With reference to FIGS. 1-5A, the operations of the method 500 may be performed by a processor (such as the processor 210, 212, 214, 216, 218, 252, 260) of a wireless device (such as the wireless device 120a-120e, 200, 320).

In determination block 502, the processor may determine whether mmWave digital beamforming is enabled for the wireless device. In various embodiments, a wireless device may be capable of using digital beamforming and/or analog beamforming and may selectively transition between using digital beamforming and/or analog beamforming. For example, determining whether mmWave digital beamforming is enabled for the wireless device may include determining whether the wireless device current settings indicate the wireless device is using mmWave digital beamforming or analog beamforming at a given time.

In response to determining that mmWave digital beamforming is not enabled for the wireless device (i.e., determination block 502="No"), the processor may await mmWave digital beamforming enablement and continue to determine whether mmWave digital beamforming is enabled for the wireless device in determination block 502.

In response to determining that mmWave digital beamforming is enabled for the wireless device (i.e., determination block 502="Yes"), the processor may perform operations including sending an indication to the base station that the wireless device is capable of using digital beamforming for WUS reception in block 504. In various embodiments, sending the indication to the base station that the wireless device is capable of using digital beamforming for WUS reception may include sending the indication in a control message sent from the wireless device to the base station, such as a UCI message, a MAC-CE message, a RRC message, etc. In some embodiments, sending the indication to the base station that the wireless device is capable of using digital beamforming for WUS reception may include sending an indication that the wireless device is capable of mmWave digital beamforming for WUS reception in any mmWave frequency range, such as FR2, FR4, etc.

In block 506, the processor may perform operations including receiving a WUS configuration message from the base station, the WUS configuration message indicating a WUS monitoring occasion for a DRX cycle and a single beam configuration for the WUS monitoring occasion. A single beam configuration may be a beam configuration having a single TCI state. A single beam configuration having a single TCI state may differ from other types of beam configurations in which the beam configuration may have multiple TCI states. In some embodiments, WUS configuration message from the base station may indicate more than one WUS monitoring occasions for the single DRX cycle and a single beam configuration for each of the more than one WUS monitoring occasions. In some embodiments, the one or more WUS monitoring occasions may be associated with a same CORESET. In some embodiments, the one or more WUS monitoring occasions may be a single WUS monitoring occasion. In some embodiments, the one or more WUS monitoring occasions may be multiple WUS monitoring occasions.

In block 508, the processor may perform operations including using digital beamforming to receive a WUS message from the base station during the WUS monitoring occasion in response to receiving the WUS configuration message from the base station. For example, the processor may perform digital beamforming to receive a WUS message in a mmWave frequency range, such as FR2, FR4, etc. In some embodiments, such as in scenarios in which more than one WUS monitoring occasions for the single DRX cycle is indicated in the WUS configuration message, the processor may perform operations including using digital beamforming to receive a WUS message from the base station during at least one of the one or more WUS monitoring occasions in response to receiving the WUS configuration message from the base station.

In determination block 510, the processor may determine whether wake-up is required by determining whether a received WUS message indicates a PDCCH message is to be transmitted from the base station to the wireless device in the next on-duration period of the next DRX cycle. A WUS message indicating a PDCCH message is to be transmitted may indicate wake-up is required. A WUS message indicating no PDCCH message is to be transmitted may indicate wake-up is not required.

In response to determining that wake-up is not required (i.e., determination block 510="No"), the processor may await the next WUS monitoring occasion and perform operations including using digital beamforming to receive a WUS message from the base station during at least one of the one or more WUS monitoring occasions in determination block 508.

In response to determining that wake-up is required (i.e., determination block 510="Yes"), the processor may perform operations including receiving a PDCCH message during the single DRX cycle in block 512. In some embodiments, receiving the PDCCH message during the single DRX cycle may include using analog beamforming to receive the PDCCH message during the single DRX cycle. In some embodiments, receiving a PDCCH message during the single DRX cycle may include receiving a PDCCH message during the single DRX cycle on a beam having the same beam configuration as the single beam configuration for the WUS monitoring occasion. In some embodiments, receiving a PDCCH message during the single DRX cycle may include receiving a PDCCH message during the single DRX cycle on a beam having a different beam configuration than the single beam configuration for the WUS monitoring occasion. In some embodiments, receiving the PDCCH message during the single DRX cycle may include using digital beamforming to receive the PDCCH message during the single DRX cycle on a beam having a different beam configuration than the single beam configuration for each of the one or more WUS monitoring occasions. In some embodiments, the different beam configuration may include a different TCI state. In some embodiments, the WUS message and the PDCCH message may be different format downlink control information (DCI) messages.

Figure 5B:
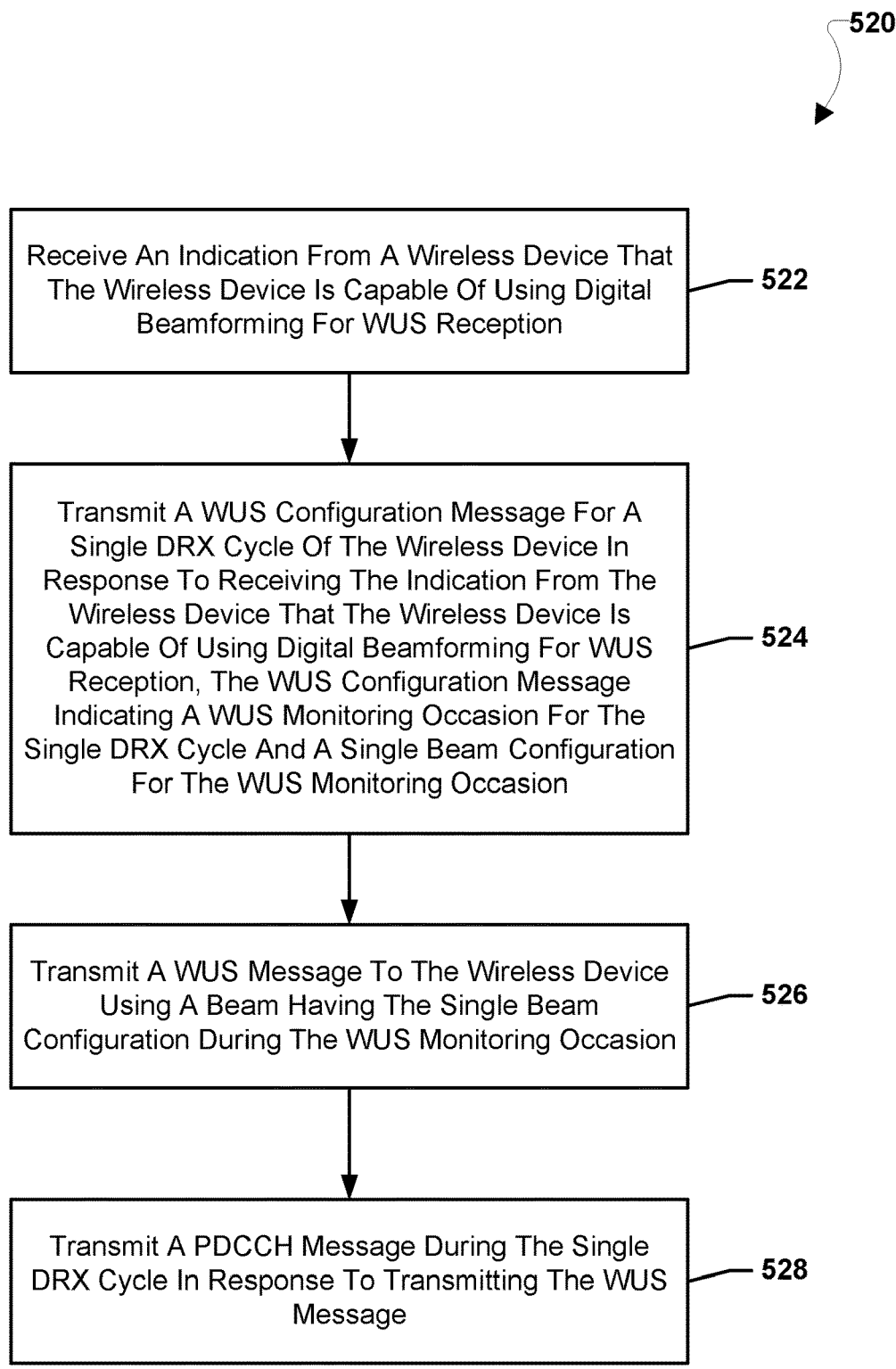
FIG. 5B is a process flow diagram illustrating a method for managing communications with a wireless device in accordance with various embodiments.

FIG. 5B is a process flow diagram illustrating a method 520 that may be performed by a processor of a base station for managing communications with a wireless device in accordance with various embodiments. With reference to FIGS. 1-5B, the method 520 may be implemented by a processor of a network computing device (e.g., the base station 110a-d, 350). In various embodiments, the operations of method 520 may be performed in conjunction with the operations of method 500 (FIG. 5A).

In block 522, the processor may perform operations including receiving an indication from a wireless device that the wireless device is capable of using digital beamforming for WUS reception. For example, the indication may be an indication that the wireless device is capable of using digital beamforming for WUS reception in mmWave frequencies, such as FR2 frequencies, FR4 frequencies, etc. In various embodiments, the indication that the wireless device is capable of using digital beamforming for WUS reception may be received in a message from the wireless device, such as a UCI message, a MAC-CE message, a RRC message, etc.

In block 524, the processor may perform operations including transmitting a WUS configuration message for a single DRX cycle of the wireless device in response to receiving the indication from the wireless device that the wireless device is capable of using digital beamforming for WUS reception, the WUS configuration message indicating a WUS monitoring occasion for the single DRX cycle and a single beam configuration for the WUS monitoring occasion. A single beam configuration may be a beam configuration having a single TCI state. A single beam configuration having a single TCI state may differ from other types of beam configurations in which the beam configuration may have multiple TCI states. In some embodiments, more than one WUS monitoring occasion for the single DRX cycle and a single beam configuration for each of the more than one WUS monitoring occasions may be indicated in the WUS configuration message. In some embodiments, the WUS configuration message may indicate one or more WUS monitoring occasions for the single DRX cycle and a single beam configuration for each of the one or more WUS monitoring occasions. In some embodiments, the one or more WUS monitoring occasions may be a single WUS monitoring occasion. In embodiments in which the one or more WUS monitoring occasions are a single WUS monitoring occasion, a WUS message may be transmitted by the base station only once per DRX cycle. In some embodiments, the one or more WUS monitoring occasions may be multiple WUS monitoring occasions in each of which a WUS message is transmitted by the base station with the same beam configuration during each DRX cycle. In some embodiments, the one or more WUS monitoring occasions may be multiple WUS monitoring occasions each associated with the same CORESET.

In block 526, the processor may perform operations including transmitting a WUS message to the wireless device using a beam having the single beam configuration during the WUS monitoring occasion. In some embodiments, such as in scenarios in which more than one WUS monitoring occasion for the single DRX cycle is indicated in the WUS configuration message, the processor may perform operations including transmitting a WUS message to the wireless device using a beam having the single beam configuration during the more than one WUS monitoring occasion. In embodiments in which the one or more WUS monitoring occasions may be a single WUS monitoring occasion, a WUS message may be transmitted by the base station only once per DRX cycle. In embodiments in which the one or more WUS monitoring occasions may be multiple WUS monitoring occasions, a WUS message may be transmitted by the base station with the same beam configuration during each WUS monitoring occasion.

In block 528, the processor may perform operations including transmitting a PDCCH message during the single DRX cycle in response to transmitting the WUS message. In some embodiments, the processor may perform operations including transmitting a PDCCH message during the single DRX cycle on a beam having the same beam configuration as the single beam configuration. In some embodiments, the processor may perform operations including transmitting a PDCCH message during the single DRX cycle on a beam having a different beam configuration than the single beam configuration. In various embodiments, the PDCCH message may be transmitted after transmitting a WUS message indicating wake-up was required. In some embodiments, the different beam configuration may be different TCI states for the WUS message beam and the PDCCH beam. In some embodiments, the WUS message and the PDCCH message may be different format DCI messages.

Figure 5C:
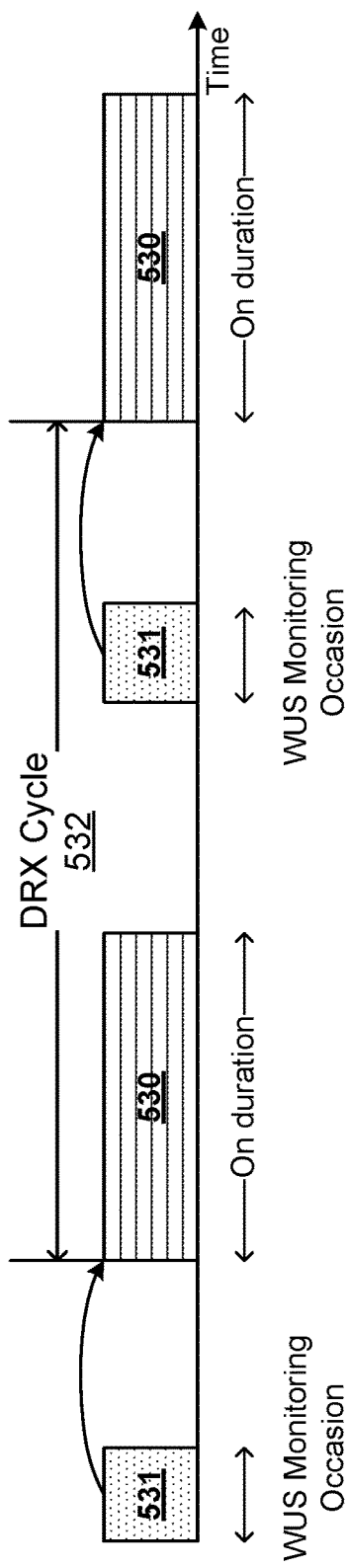
FIG. 5C is time diagram illustrating a wake-up signal (WUS) monitoring occasion for a discontinuous reception (DRX) cycle according to various embodiments.

FIG. 5C is time diagram illustrating a WUS monitoring occasion 531 for a DRX cycle according to various embodiments. With reference to FIGS. 1-5C, the WUS monitoring occasion 531 of FIG. 5C may be a single WUS monitoring occasion per DRX cycle 532 for mmWave frequencies, such as FR2 frequencies, FR4, frequencies, etc., managed according to the operations of methods 500 and/or 520. The WUS monitoring occasion 531 may precede the DRX cycle 532 and only a single WUS monitoring occasion 531 may be required to signal to the wireless device that wake-up during the on-duration 530 of the DRX cycle 532 is required. In some embodiments, the beam used by the base station to send the WUS message during the single WUS monitoring occasion 531 may have a different TCI than the beam used by the base station to send a PDCCH message during the on duration 532 of the DRX cycle 532.

Figure 5D:
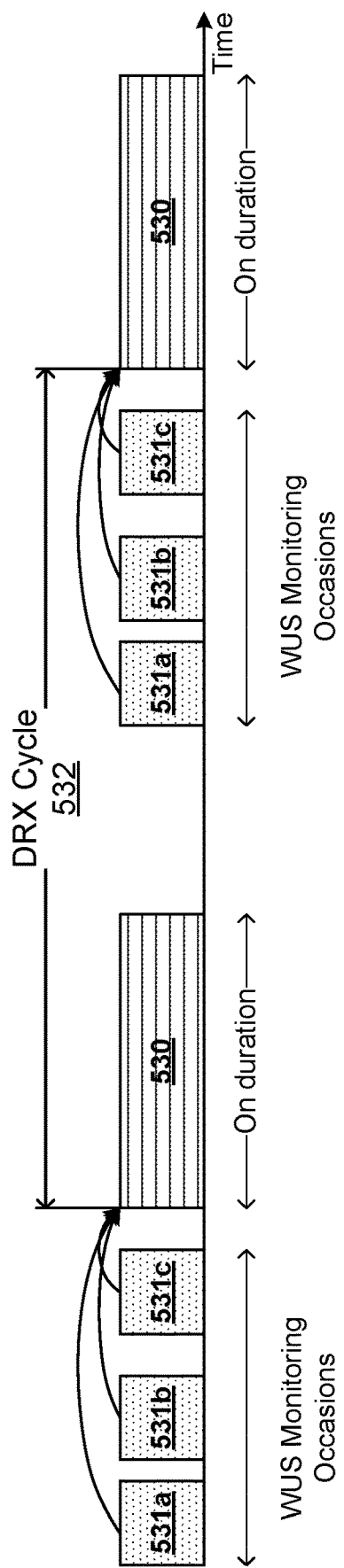
FIG. 5D is time diagram illustrating multiple WUS monitoring occasions for a DRX cycle according to various embodiments.

FIG. 5D is time diagram illustrating multiple WUS monitoring occasions 531a, 531b, 531c for a DRX cycle according to various embodiments. With reference to FIGS. 1-5D, the WUS monitoring occasions 531a, 531b, 531c of FIG. 5D may be a multiple WUS monitoring occasions 531a, 531b, 531c per DRX cycle 532 for mmWave frequencies, such as FR2 frequencies, FR4, frequencies, etc., managed according to the operations of methods 500 and/or 520. The WUS monitoring occasions 531a, 531b, 531c may precede the DRX cycle 532 and any of the WUS monitoring occasions 531a, 531b, 531c may signal to the wireless device that wake-up during the on-duration 530 of the DRX cycle 532 is required. In some embodiments, the same beam may be used to send the WUS message during all three of the WUS monitoring occasions 531a, 531b, 531c. In some embodiments, the beam used by the base station to send the WUS message during the WUS monitoring occasions 531a, 531b, 531c may have a different TCI than the beam used by the base station to send a PDCCH message during the on duration 532 of the DRX cycle 532.

Figure 6:
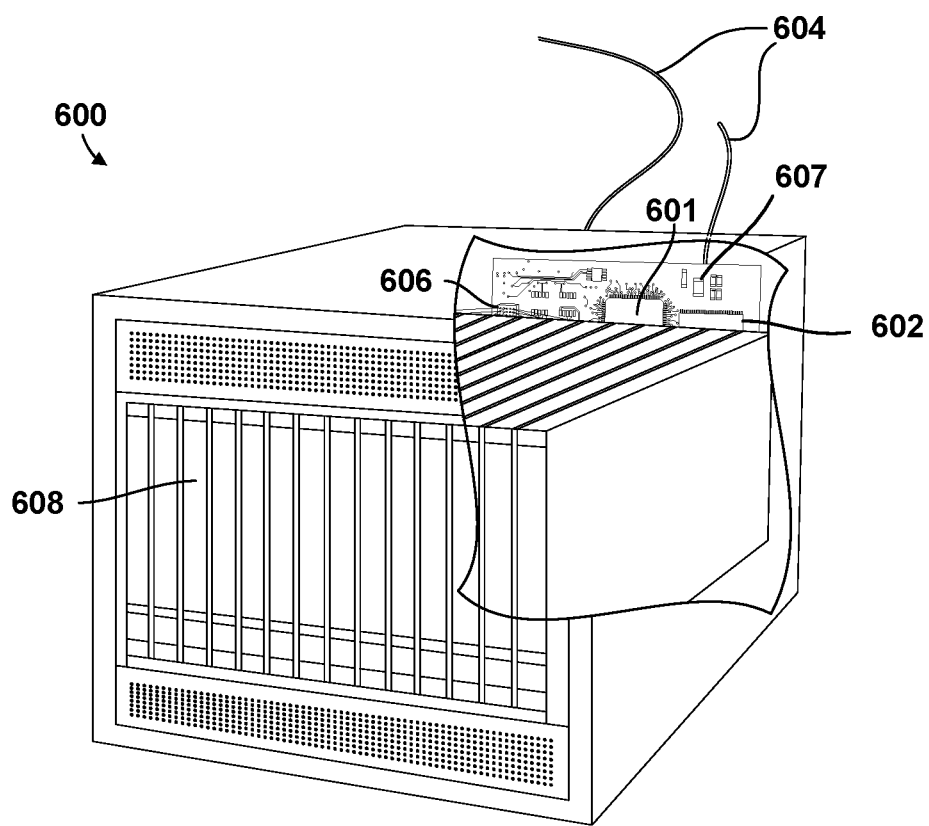
FIG. 6 is a component block diagram of a network computing device suitable for use with various embodiments.

FIG. 6 is a component block diagram of a network computing device suitable for use with various embodiments. Such network computing devices (e.g., base station 110a-110d, 350) may include at least the components illustrated in FIG. 6. With reference to FIGS. 1-6, the network computing device 600 may typically include a processor 601 coupled to volatile memory 602 and a large capacity non-volatile memory, such as a disk drive 608. The network computing device 600 also may include a peripheral memory access device 606 such as a floppy disc drive, compact disc (CD) or digital video disc (DVD) drive coupled to the processor 601. The network computing device 600 also may include network access ports 604 (or interfaces) coupled to the processor 601 for establishing data connections with a network, such as the Internet or a local area network coupled to other system computers and servers. The network computing device 600 may include one or more antennas 607 for sending and receiving electromagnetic radiation that may be connected to a wireless communication link. The network computing device 600 may include additional access ports, such as USB, Firewire, Thunderbolt, and the like for coupling to peripherals, external memory, or other devices.

Figure 7:
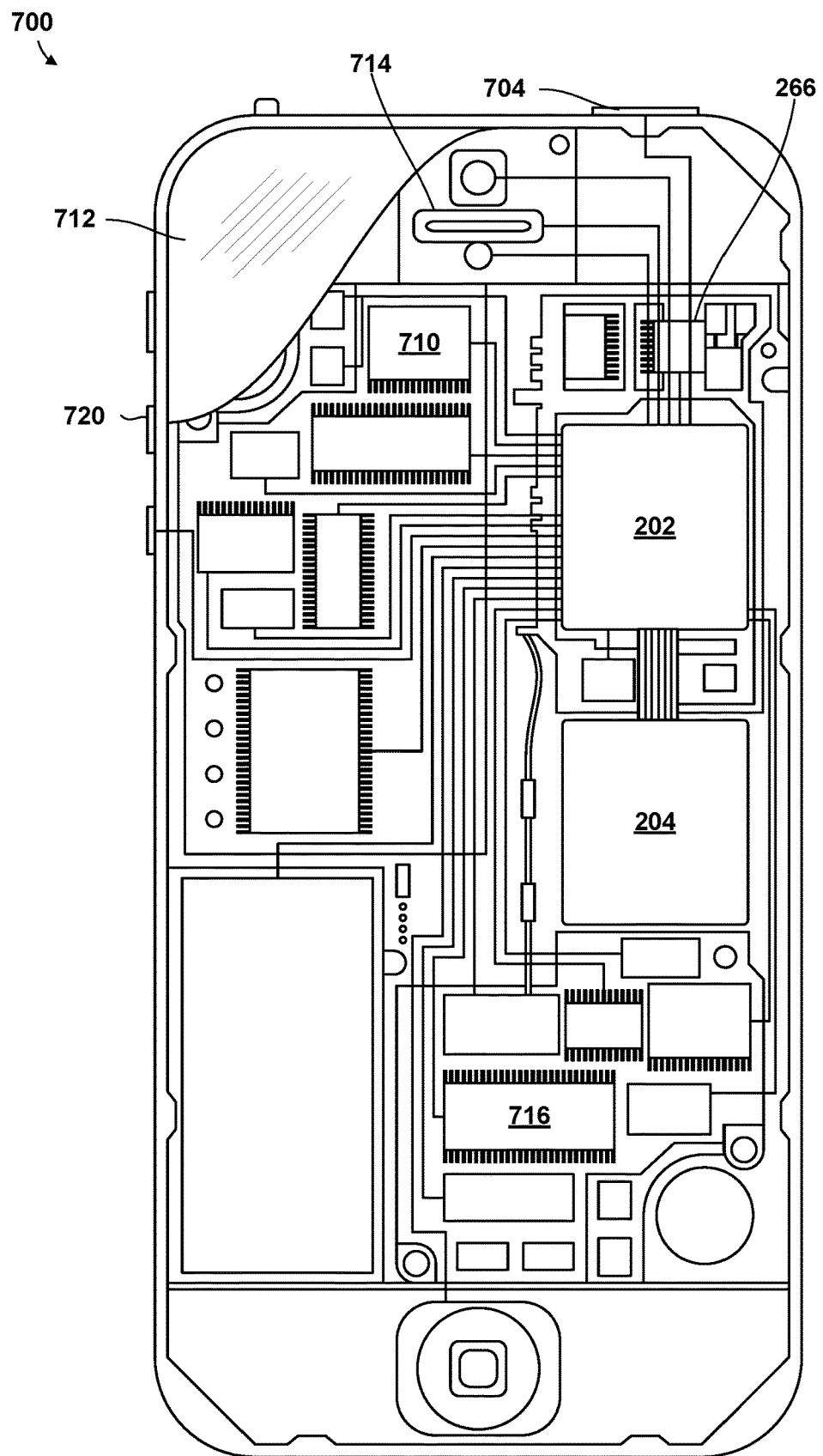
FIG. 7 is a component block diagram of a wireless communication device suitable for use with various embodiments.

FIG. 7 is a component block diagram of a wireless device 700 suitable for use with various embodiments. With reference to FIGS. 1-7, various embodiments may be implemented on a variety of wireless devices 700 (for example, the wireless device 120a-120e, 200, 320), an example of which is illustrated in FIG. 7 in the form of a smartphone. The wireless device 700 may include a first SOC 202 (for example, a SOC-CPU) coupled to a second SOC 204 (for example, a 5G capable SOC). The first and second SOCs 202, 204 may be coupled to internal memory 716, a display 712, and to a speaker 714. Additionally, the wireless device 700 may include one or more antenna panels 704 (e.g., four panels) each made up of a number of antenna elements (e.g., 4-8 elements) configured for receiving RF signals via digital beamforming as describe herein. The antenna panels 704 may be configured as antenna arrays (e.g., antenna array 402). The antenna panels 704 may be connected to a wireless transceiver 266 coupled to one or more processors in the first or second SOCs 202, 204. Smartphones 700 typically also include menu selection buttons or rocker switches 720 for receiving user inputs.

A wireless device 700 may also include a sound encoding/decoding (CODEC) circuit 710, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 710 may include various signal processing circuits, alone or in combinations, such as digital signal processor (DSP) circuits, analog signal processor circuits, etc. As a specific example, the wireless transceiver 266 may include processing circuits and/or other components of the mmWave receiver 400 and or the mmWave transmitter 450.

The processors of the network computing device 600 and the wireless device 700 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 716 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term-evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500-520 may be substituted for or combined with one or more operations of the methods 500-520.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the example methods; the example methods discussed in the following paragraphs implemented by a computing device including means for performing functions of the example methods of the; and the example methods discussed in the following paragraphs implemented as a non-transitory processor-readable storage medium having stored thereon processor-executable instructions configured to cause a processor of a computing device to perform the operations of the example methods.

Example 1. A method performed by a processor of a wireless device for managing communications with a base station, includes: sending an indication to the base station that the wireless device is capable of using digital beamforming for WUS reception; receiving a WUS configuration message from the base station, the WUS configuration message indicating a WUS monitoring occasion for a single DRX cycle and a single beam configuration for the WUS monitoring occasion; and using digital beamforming to receive a WUS message from the base station during the WUS monitoring occasion in response to receiving the WUS configuration message from the base station.

Example 2. The method of example 1, further includes: receiving a PDCCH message during the single DRX cycle in response to receiving the WUS message from the base station during the WUS monitoring occasion.

Example 3. The method of example 2, in which receiving the PDCCH message during the single DRX cycle comprises receiving the PDCCH message during the single DRX cycle on a beam having a different beam configuration than the single beam configuration for the WUS monitoring occasion.

Example 4. The method of example 3, in which the different beam configuration comprises a different TCI state.

Example 5. The method of example 2, in which receiving the PDCCH message during the single DRX cycle comprises receiving the PDCCH message during the single DRX cycle on a beam having a same beam configuration as the single beam configuration for the WUS monitoring occasion.

Example 6. The method of any of examples 2-5, in which receiving the PDCCH message during the single DRX cycle comprises using digital beamforming to receive the PDCCH message during the single DRX cycle.

Example 7. The method of any of examples 2-6, in which the WUS message and the PDCCH message are different format DCI messages.

Example 8. The method of any of examples 1-7, in which sending the indication to the base station that the wireless device is capable of digital beamforming for WUS reception comprises sending the indication in one of a UCI message, a MAC-CE message, or an RRC message.

Example 9. The method of any of examples 1-8, in which sending the indication to the base station that the wireless device is capable of digital beamforming for WUS reception comprises sending an indication to the base station that the wireless device is capable of mmWave digital beamforming for WUS reception in one of FR 2 or FR4.

Example 10. A method performed by a processor of a base station for managing communications with wireless devices, includes: receiving an indication from a wireless device that the wireless device is capable of using digital beamforming for WUS reception; transmitting a WUS configuration message for a single DRX cycle of the wireless device in response to receiving the indication from the wireless device that the wireless device is capable of using digital beamforming for WUS reception, the WUS configuration message indicating a WUS monitoring occasion for the single DRX cycle and a single beam configuration for the WUS monitoring occasion.

Example 11. The method of example 10, further includes: transmitting a WUS message to the wireless device using a beam having the single beam configuration during the WUS monitoring occasion.

Example 12. The method of example 11, further includes: transmitting a PDCCH message during the single DRX cycle in response to transmitting the WUS message.

Example 13. The method of example 12, in which transmitting the PDCCH message during the single DRX cycle comprises transmitting the PDCCH message during the single DRX cycle using a beam having a same beam configuration as the single beam configuration.

Example 14. The method of example 12, in which transmitting the PDCCH message during the single DRX cycle comprises transmitting the PDCCH message during the single DRX cycle using a beam having a different beam configuration than the single beam configuration.

Example 15. The method of example 14, in which the different beam configuration comprises a different TCI state.

Example 16. The method of example 12, in which the WUS message and the PDCCH message are different format DCI messages.

Example 17. The method of any of examples 10-16, in which the indication from the wireless device that the wireless device is capable of digital beamforming for WUS reception is received in one of a UCI message, a MAC-CE message, or an RRC message.

Example 18. The method of any of examples 10-17, in which receiving the indication from the wireless device that the wireless device is capable of digital beamforming for WUS reception comprises receiving an indication from the wireless device that the wireless device is capable of mmWave digital beamforming for WUS reception in one of FR 2 or FR4.

Example 19. The method of example 18, in which the beam having the single beam configuration comprises one of a mmWave beam in FR2 or a mmWave beam in FR4.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for managing communications with a base station, comprising:

sending an indication to the base station that the wireless device is capable of using digital beamforming for wake-up signal (WUS) reception;

receiving a WUS configuration message from the base station, the WUS configuration message indicating a WUS monitoring occasion for a single discontinuous reception (DRX) cycle and a single beam configuration for the WUS monitoring occasion; and using digital beamforming via a digital beamforming receiver to receive a WUS message from the base station during the WUS monitoring occasion in response to receiving the WUS configuration message from the base station, wherein the digital beamforming receiver comprises an antenna array having one or more antenna elements that are each connected to their own respective analog-to-digital converter.

2. The method of claim 1, further comprising:

receiving a physical downlink control channel (PDCCH) message during the single DRX cycle in response to receiving the WUS message from the base station during the WUS monitoring occasion.

3. The method of claim 2, wherein receiving the PDCCH message during the single DRX cycle comprises receiving the PDCCH message during the single DRX cycle on a beam having a different beam configuration than the single beam configuration for the WUS monitoring occasion.

4. The method of claim 3, wherein the different beam configuration comprises a different transmission configuration indicator (TCI) state.

5. The method of claim 2, wherein receiving the PDCCH message during the single DRX cycle comprises receiving the PDCCH message during the single DRX cycle on a beam having a same beam configuration as the single beam configuration for the WUS monitoring occasion.

6. The method of claim 2, wherein receiving the PDCCH message during the single DRX cycle comprises using digital beamforming via the digital beamforming receiver to receive the PDCCH message during the single DRX cycle.

7. The method of claim 2, wherein the WUS message and the PDCCH message are different format downlink control information (DCI) messages.

8. The method of claim 1, wherein sending the indication to the base station that the wireless device is capable of digital beamforming for WUS reception comprises sending the indication in one of an uplink control information (UCI) message, a medium access control (MAC) control element (CE)(MAC-CE) message, or a radio resource control (RRC) message.

9. The method of claim 1, wherein sending the indication to the base station that the wireless device is capable of digital beamforming for WUS reception comprises sending an indication to the base station that the wireless device is capable of millimeter wave (mmWave) digital beamforming for WUS reception in one of Frequency Range (FR) 2 or FR4.

10. A method performed by a processor of a base station for managing communications with wireless devices, comprising:

receiving an indication from a wireless device that the wireless device is capable of using digital beamforming for wake-up signal (WUS) reception, wherein the digital beamforming comprises beamforming by the wireless device using an antenna array having one or more antenna elements that are each connected to their own respective analog-to-digital converter; and transmitting a WUS configuration message for a single discontinuous reception (DRX) cycle of the wireless device in response to receiving the indication from the wireless device that the wireless device is capable of using digital beamforming for WUS reception, the WUS configuration message indicating a WUS monitoring occasion for the single DRX cycle and a single beam configuration for the WUS monitoring occasion.

11. The method of claim 10, further comprising:

transmitting a WUS message to the wireless device using a beam having the single beam configuration during the WUS monitoring occasion.

12. The method of claim 11, further comprising:

transmitting a physical downlink control channel (PDCCH) message during the single DRX cycle in response to transmitting the WUS message.

13. The method of claim 12, wherein transmitting the PDCCH message during the single DRX cycle comprises transmitting the PDCCH message during the single DRX cycle using a beam having a same beam configuration as the single beam configuration.

14. The method of claim 12, wherein transmitting the PDCCH message during the single DRX cycle comprises transmitting the PDCCH message during the single DRX cycle using a beam having a different beam configuration than the single beam configuration.

15. The method of claim 14, wherein the different beam configuration comprises a different transmission configuration indicator (TCI) state.

16. The method of claim 12, wherein the WUS message and the PDCCH message are different format downlink control information (DCI) messages.

17. The method of claim 10, wherein the indication from the wireless device that the wireless device is capable of digital beamforming for WUS reception is received in one of an uplink control information (UCI) message, a medium access control (MAC) control element (CE)(MAC-CE) message, or a radio resource control (RRC) message.

18. The method of claim 10, wherein receiving the indication from the wireless device that the wireless device is capable of digital beamforming for WUS reception comprises receiving an indication from the wireless device that the wireless device is capable of millimeter wave (mmWave) digital beamforming for WUS reception in one of Frequency Range (FR) 2 or FR4.

19. The method of claim 11, wherein the beam having the single beam configuration comprises one of a mmWave beam in FR2 or a mmWave beam in FR4.

20. A wireless device, comprising:

a digital beamforming receiver comprising an antenna array having one or more antenna elements, each of the one or more antenna elements connected to their own respective analog-to-digital converter; and a processor connected to the digital beamforming receiver and configured with processor-executable instructions to:

send an indication to a base station that the wireless device is capable of using digital beamforming for wake-up signal (WUS) reception;

receive a WUS configuration message from the base station, the WUS configuration message indicating a WUS monitoring occasion for a single discontinuous reception (DRX) cycle and a single beam configuration for the WUS monitoring occasion; and use digital beamforming via the digital beamforming receiver to receive a WUS message from the base station during the WUS monitoring occasion in response to receiving the WUS configuration message from the base station.

21. The wireless device of claim 20, wherein the processor is further configured with processor-executable instructions to:

receive a physical downlink control channel (PDCCH) message during the single DRX cycle in response to receiving the WUS message from the base station during the WUS monitoring occasion.

22. The wireless device of claim 21, wherein the processor is further configured with processor-executable instructions to receive the PDCCH message during the single DRX cycle by receiving the PDCCH message during the single DRX cycle on a beam having a different beam configuration than the single beam configuration for the WUS monitoring occasion.

23. The wireless device of claim 21, wherein the processor is further configured with processor-executable instructions to receive the PDCCH message during the single DRX cycle by receiving the PDCCH message during the single DRX cycle on a beam having a same beam configuration as the single beam configuration for the WUS monitoring occasion.

24. The wireless device of claim 21, wherein the processor is further configured with processor-executable instructions to receive the PDCCH message during the single DRX cycle by using digital beamforming via the digital beamforming receiver to receive the PDCCH message during the single DRX cycle.

25. The wireless device of claim 20, wherein the processor is further configured with processor-executable instructions to send the indication to the base station that the wireless device is capable of digital beamforming for WUS reception by sending the indication in one of an uplink control information (UCI) message, a medium access control (MAC) control element (CE)(MAC-CE) message, or a radio resource control (RRC) message.

26. The wireless device of claim 20, wherein the processor is further configured with processor-executable instructions to send the indication to the base station that the wireless device is capable of digital beamforming for WUS reception by sending an indication to the base station that the wireless device is capable of millimeter wave (mmWave) digital beamforming for WUS reception in one of Frequency Range (FR) 2 or FR4.

27. A base station, comprising:
a processor configured with processor-executable instructions to:
receive an indication from a wireless device that the wireless device is capable of using digital beamforming for wake-up signal (WUS) reception, wherein the digital beamforming comprises beamforming by the wireless device using an antenna array having one or more antenna elements that are each connected to their own respective analog-to-digital converter; and
transmit a WUS configuration message for a single discontinuous reception (DRX) cycle of the wireless device in response to receiving the indication from the wireless device that the wireless device is capable of using digital beamforming for WUS reception, the WUS configuration message indicating a WUS monitoring occasion for the single DRX cycle and a single beam configuration for the WUS monitoring occasion.

28. The base station of claim 27, wherein the processor is further configured with processor-executable instructions to:
transmit a WUS message to the wireless device using a beam having the single beam configuration during the WUS monitoring occasion.

29. The base station of claim 28, wherein the processor is further configured with processor-executable instructions to:
transmit a physical downlink control channel (PDCCH) message during the single DRX cycle in response to transmitting the WUS message.

30. The base station of claim 29, wherein the processor is further configured with processor-executable instructions to transmit the PDCCH message during the single DRX cycle by transmitting the PDCCH message during the single DRX cycle using a beam having a same beam configuration as the single beam configuration.

* * * * *